Dec. 22, 1964     K. LUFT     3,162,761
APPARATUS FOR ANALYZING A MIXTURE OF SUBSTANCES
BY SELECTIVE ABSORPTION OF INFRARED RADIATION
Filed May 29, 1961
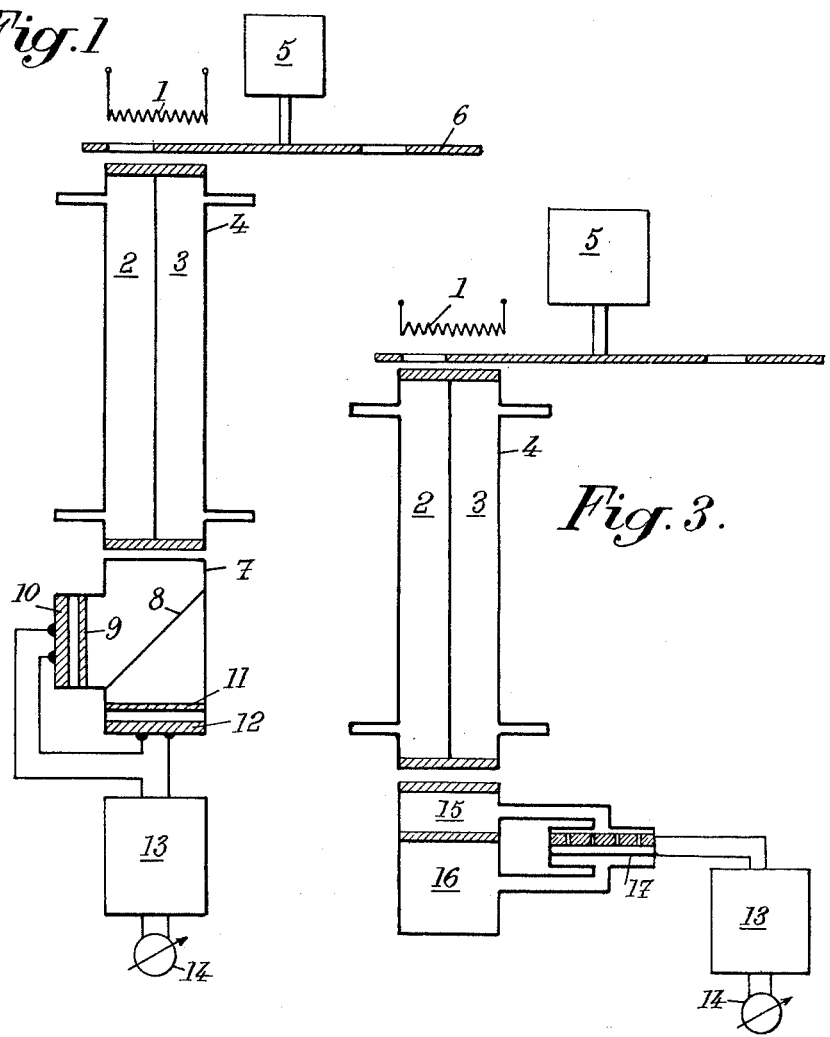
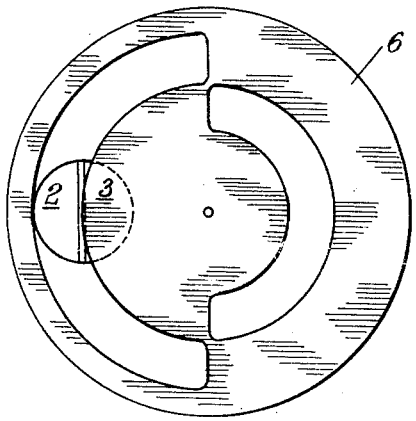
INVENTOR
Karl Luft
BY
Bailey, Stephens & Huettig
ATTORNEYS

United States Patent Office 3,162,761
Patented Dec. 22, 1964

3,162,761
APPARATUS FOR ANALYZING A MIXTURE OF SUBSTANCES BY SELECTIVE ABSORPTION OF INFRARED RADIATION
Karl Luft, Essen-Kray, Germany, assignor to Office National d'Etudes et de Recherches Aeronautiques O.N.E.R.A., Chatillon-sous-Bagneux, France, an organized body of France
Filed May 29, 1961, Ser. No. 113,467
Claims priority, application Germany, June 3, 1960, B 58,110
4 Claims. (Cl. 250—43.5)

The present invention relates to methods and apparatus for analyzing mixtures of substances.

For the last twenty years, use has been made of analysis methods based upon the principle of selective absorption of rays and in particular infra-red rays.

In one of the known methods (German Patent No. 730,478, filed March 8, 1938) use is made of a symmetrical apparatus comprising two sources of rays, two cells, one of which (called measurement cell) contains the mixture to be analysed whereas the other one (called reference cell) contains a reference or comparison substance and in particular a gas, and two selective detectors consisting of chambers containing a substance, in particular a gas, having at least approximately the same absorption bands as the component to be measured in the mixture, the arrangement being such that the beam of rays is cut off simultaneously for both of them, by a rotary shutter, whereas the difference between the pressure pulses obtained in the two detectors is measured.

According to another method which is a modification of the preceding one, the radiation is cut off alternately for the two ray beams, the two resultant radiations being treated by means of a "beam combiner" and the radiations thus combined being transmitted to a common selective detector.

On the other hand, there are known method making use as selective detectors of photo-electric cells made sensitive, by means of filters, to the wavelengths which correspond to the bands or rays of absorption of the substance to be detected and measured.

These methods generally give good results but they however involve some drawbacks. In the case of the first mentioned method, the signals received in the two detector chambers are of relatively high intensity since, in each of them, the whole of the radiations inside the absorption bands of the detector gases is practically absorbed. However, the difference that is measured due to the absorption effect exerted on the gas present in the measurement cell disposed between the radiation source and one of the detectors, is small. For instance, when a percentage of 0.001 of CO is to be measured in the gas to be analyzed, the difference between the signals of the two detectors corresponds approximately to only $1/1000$ of the total amplitude of the signals obtained in these detectors. In order to obtain, for measurement purposes, a sufficiently constant "zero" point, the absolute signals must consequently have a very accurate constancy which, in many cases, requires special precautions, such as keeping the apparatus at a rigorously constant temperature, by means for instance of a thermostat device.

In the second method referred to, only one signal is obtained which corresponds to the difference of absorption for the two paths of rays, but in this method also it is difficult to obtain a constant zero point for a high sensitivity. This is due to the fact that not only the selective absorption of the rays in the vessel containing the mixture to be analyzed produces a variation and therefore creates a signal but also that any other variation of the balancing between the two radiations produced a non-selective variation which causes a displacement of the zero point. In the case of the above mentioned example where a percentage of CO approximating 0.001 is to be measured, it was found that a variation of the balancing of an importance corresponding to 1% is already sufficient to give an erroneous measurement indication equal to that which would correspond to a concentration of CO ten times higher than that existing actually.

The object of the present invention is to eliminate the drawbacks of such prior methods and to achieve a satisfactory stability of the zero point which is quite necessary in the case of automatic analysis apparatus.

The method according to the present invention, according to which two substantially identical ray beams, called "measurement beam" and "reference beam" respectively, are used, is characterized by the fact that these beams, which are intermittently cut off, are caused to act successively and alternately upon a common detector device comprising two selective detector elements, one of said elements being sensitive practically only to rays of wavelengths corresponding to the maximum of absorption in the range of the wavelengths of the rays capable of being selectively absorbed by the component to be measured of the mixture, said rays forming a first partial radiation, the other of said elements being sensitive to the rays of a second partial radiation comprising at least rays of wavelengths different from those of said maximum absorption rays, the wavelength band widths of said two respective partial radiations and the intensity with which they act upon said detector elements respectively being chosen such that the signals produced by the two detector elements are at least approximately equal as long as there is no selective absorption from said two beams for wavelength ranges corresponding to said partial radiations, the difference between the respective signals supplied simultaneously by said detector elements in response to the action thereon of each of said measurement mean and said reference beam alternately being determined in the form of a differential signal, and the differential signals supplied by said respective beams being compared together.

Preferred embodiments of the present invention will be hereinafter described with reference to the accompanying drawings, given merely by way of example, and in which:

FIG. 1 diagrammatically shows a first embodiment of an apparatus according to my invention.

FIG. 2 is a plan view corresponding to FIG. 1.

FIG. 3 diagrammatically shows a second embodiment of this invention.

Referring first to FIGS. 1 and 2, rays supplied by a source 1 pass in the form of two substantially identical beams through two cells 2 and 3 formed by adjacent chambers of a container 4, these two cells being closed in a fluid type manner with respect to each other. The two beams are modulated in phase opposition (180°) by a rotary shutter 6 driven by a suitable motor 5. The mixture to be analyzed flows through cell 2 which therefore constitutes the measurement cell whereas cell 3, which constitutes the reference cell, contains a reference substance. The beam passing through cell 2 is the measurement beam and the beam passing through cell 3 is the reference beam. Each of these beams, after it has passed through its cell enters a common detector 7 where it is divided into two partial beams by means of a semitransparent mirror 8. The partial beam that is reflected from this mirror passes through a filter 9 and enters a photo-electric cell 10, whereas the partial beam that has passed through mirror 8 passes through a filter 11 and enters a photo-electric cell 12. The difference between the alternating voltages produced by the two photo-electric cells respectively is amplified in an amplifier 13 and measured, possibly after rectifying, by means of a millivoltmeter 14.

The permeability of filter 9 corresponds as exactly as possible to the maximum absorption by the substance to be measured. In other words, this filter 9 permits the passage of practically only the rays that constitute the above mentioned first partial radiation. On the contrary, filter 11 either has a band width containing the same range but substantially greater or it is of a permeability corresponding to a range offset with respect to that determined by filter 9, the rays passing through filter 11 constituting the above mentioned second partial radiation.

The reflection and/or permeability characteristics of mirror 8 are preferably chosen such that, as long as there is no selective absorption in cells 2 and 3, the intensities of the partial radiations respectively received by photoelectric cell 10 and photo-electric cell 12 are at least approximately equal. This means that for the same maximum permeability of the filters and for the same sensibility of the photo-electric cells, the ratio of the reflected radiation to the radiation passing through mirror 8 is at least approximately equal to the ratio of the respective band width of filter 11 to the band width of filter 9.

When the measurement band and the reference beam are equal, and there is no absorbing substance in cell 2, the compositions of the beams that successively and alternately strike detector 7 (due to the action of shutter 6 which might quite as well be disposed under the vessel 4) are practically the same. In this case, the difference between the voltage supplied by detector cells 10 and 12 under the influence either of the measurement beam or of the reference beam is practically zero and amplifier 12 has no alternating voltage applied to its input so that instrument 14 indicates a value equal to zero.

When the balancing between the two beams is modified by a non-selective cause, for instance by a variation of the intensity of the source or by a radiation of the permeability of one of the cells 2 and 3 due to the presence of impurities, the differential voltages obtained at the output of the detector remain equal to zero. It is only in the case where, in cell 2, there is a selective absorption by the substance to be measured that the variation due to this selective absorption acts in a substantial manner on photoelectric cell 10 alone, whereas the influence upon the signal produced by photo-electric cell 12 is substantially similar and may even be zero, in the case where the range of permeability of filter 11 is outside of the range of absorption of the substance to be measured.

Owing to this arrangement, the drawbacks of prior methods (to wit the production of a measurement signal in the form of a difference between two signals of great amplitude and the action of a non-selective modulation) are eliminated so that the stability of the zero point is achieved in a very satisfactory manner.

Of course, use might be made of two separate radiation sources and of two separate vessels provided that the beams that have passed through these vessels both arrive upon the same detector device.

In addition to the above indications concerning the apparatus of FIGS. 1 and 2 it should be noted that:

If, as it is generally the case, the mixture to be analyzed is a mixture of gases, the reference substance in cell 3 is also a gas or a mixture of gases.

The nature of the gas or of the mixture of gases forming the reference substance may be chosen in accordance with the following conditions:

(a) In most cases, the reference gas or gas mixture has no absorption effect on the radiation, at least for the range of wavelengths corresponding to the above mentioned partial radiations, such a gas mixture consists for instance of air;

(b) The reference gas may contain, with a constant or variable concentration, the gas to be measured in the mixture to be analyzed; such a reference gas is used in particular when it is desired to measure the difference between the concentrations of the gas to be measured in two gaseous mixtures existing, respectively, before, and after, a chemical reaction;

(c) The reference gas may consist of a gas mixture having the same components as the gas to be analyzed, with the exception of the component to be measured which is not present in the reference gas; such a reference gas is used when it is desired to measure traces of a gas in another gas of high concentration and having also a high faculty of ray absorption. In this case, for instance, the mixture of gases to be analyzed is treated chemically to remove therefrom the component to be measured and the mixture thus treated is used as reference gas.

Concerning the nature of filters 9, 11, use in preferably made of interference filters which may have very narrow transparency bands or ranges. Such filters were described in particular by R. C. Wood in the "Review of Scientific Instruments," 29, 1, S. 39, January 19, 1958.

Among the many possible applications of the apparatus illustrated by FIGS. 1 and 2 is the determination of traces of water in organic liquids, which determination constitutes a very important technical problem. The absorption band of water corresponds to a wavelength of $1.95\mu$, this absorption band being very close to the absorption bands or organic liquids. The maximum transparency of interference filter 9 therefore corresponds with the highest possible accuracy to $1.95\mu$, whereas the transparency of filter 11 is chosen to correspond approximately to a wavelength of 1.30 that is to say a wavelength for which both the absorption of water by water and that by organic liquid have a minimum value. As photo-electric cells sensitive to these wave-lengths we may use PbS photo-electric cells.

FIG. 3 shows a modification of the method according to the present invention.

In this case, use is made, in accordance with U.S. Patent No. 2,951,939, of two successive layers of gases disposed across the path of the rays and forming the detector. The first gas layer 15 preferentially absorbs the rays having wavelengths corresponding to the central portion of the wavelength absorption range (in particular to the centers of the absorption rays) of the substance to be measured in the mixture to be analyzed, the rays having these wavelengths forming the "first partial radiations," whereas the second layer 16 chiefly absorbs the rays of wavelengths corresponding to the marginal portions of the absorption range or band (in particular the flanks of said absorption rays) of the above mentioned substance. The differential pressure produced between the chambers containing said gas layers is measured by means of a diaphragm capacitor 17.

In this apparatus the measurement beam and the reference beam are both directed onto the same detector consisting of these two gas layers 15 and 16 disposed one behind the other.

Furthermore, the pressure effects caused by the absorption of these energies in these two layers are made at least approximately equal as long as there is no selective absorption of the rays in the beams, whereby the difference between the pressures produced in said layers 15 and 16 by absorption therein of the partial radiations having wavelengths comprised in the ranges or bands above defined is zero as long as there is no selective absorption in cells 2, 3.

Since the chambers of the detector are constantly under the alternative action of the beams, signals are obtained in the detector only when there is a selective absorption in the measurement cell due to the presence therein of some amount of the gas to be determined, these signals representing the difference between the radiations issuing from cells 2 and 3 respectively. This construction therefore gives the same advantages as above mentioned and, in other words, the measurements are effected on signals of small amplitude instead of being effected on high amplitude signals as in the apparatus of the above mentioned U.S. patent. Another advantage of the construction of FIG. 3 over the apparatus of this U.S. patent is the following one:

In the apparatus of this patent, particular difficulties are encountered due to the fact that the signals produced in the two chambers of the detector are of slightly different shape and phase resulting from the difference between the respective lengths of said chambers. The method according to this invention also eliminates these difficulties.

Concerning the gases constituting the absorption layers 15 and 16, they may be of the same nature as the gas to be measured in the mixture to be analyzed. In this case, they may either consist of said gas in the pure state or they may be mixed with a neutral (non absorbent) gas such as nitrogen ($N_2$) or argon (Ar). Such a mixture may for instance consist of 20% of CO and 80% of $N_2$ when the gas to be measured is CO; or it may consist of 20% of $CH_4$ and 80% of Ar when the gas to be measured is $CH_4$.

Instead of using a detector gas of the same nature as the gas to be measured in the mixture, use may also be made of other gases having absorption bands in common with the gas to be measured. Furthermore, the detector gases in chambers 15 and 16 may be either of the same nature or different nature. For instance the gas in chamber 15 may be of the same nature as the gas to be measured whereas the gas in chamber 16 is a different gas, but capable of absorbing rays having wavelengths corresponding to the flanks of the absorption rays of the gas to be measured.

Concerning the respective thicknesses or heights of chambers 15 and 16, they depend upon the nature of the detector gases and upon the pressure in each of these chambers or, in the case of a mixture of gases, upon the partial pressure of the absorbing gas in said mixture.

Merely by way of indication, the thicknesses of layers or chambers 15 and 16 will be given when it is desired to measure the amount of CO in a gaseous mixture of CO and $N_2$, the proportion of CO being about 4%. In this case, layers 15 and 16 are made of a mixture of CO and $N_2$ in which the amount of CO is 20%. The height of cells 2 and 3 may then be 10 mm., the thickness of layer 15 being 10 mm. and that of layer 16 25 mm. for pressures of the detector mixture present in chambers 15 and 16 ranging from 400 to 600 mm. of mercury.

The present invention permits of substantially improving the analysis of a mixture of substances and in particular gases within very different wavelengths ranges and in particular in the infra-red range.

This invention permits of determining accurately and in a continuous manner small traces of the components to be measured in a mixture for instance some thousandths of one percent and this without the accuracy of measurement being reduced by variations in the conditions in which the measurements are made, for instance by variations of the temperature.

What I claim is:

1. An apparatus for analyzing a mixture of substances to measure the relative amount, in said mixture, of a given component thereof capable of selectively absorbing rays of wavelengths belonging to a given range of wavelengths, which apparatus comprises, in combination, a measurement cell arranged to contain the mixture to be analyzed, a reference cell arranged to contain a reference substance, means for forming two substantially identical ray beams, one of said beams being called measurement beam and the other one reference beam, a detector device located in fixed position with respect to said cells, means for passing the measurement beam intermittently for first recurrent time periods through said measurement cell and onto said detector device, means for passing the reference beam intermittently through said reference cell and onto said detector device during second recurrent time periods corresponding to the intervals between said first recurrent time periods, said detector device comprising two distinct detector elements for producing signals in response to the action of rays thereon, the first of said detector elements selectively sensitive to rays of wavelengths corresponding to the maximum of absorption by said component in said range of wavelengths, said maximum absorption rays forming a first partial radiation of said beams, the second of said detector elements being sensitive to the rays of a second partial radiation of said beams comprising rays of wavelengths different from those of said maximum absorption rays, means for applying the first and second partial radiations of said measurement beam to said first and second detector elements, respectively, for said first recurrent time periods, means for applying the first and second partial radiation of said reference beam to said first and second detector elements, respectively, for said second recurrent time periods, and means operatively connected with both of said detector elements for comparing the value of the signal delivered by said first detector element relatively to the value of the signal delivered simultaneously by said second detector element, during the first recurrence periods, with the value of the signal delivered by said first detector element relatively to the value of the signal delivered simultaneously by said second detector element, during the second recurrence periods.

2. An apparatus according to claim 1 wherein said means for applying the first and second partial radiations of said measurement beam to said first and second detector elements, respectively, for said first recurrent time periods and the means for applying the first and second partial radiations of said reference beam to said first and second detector elements, respectively, for said second recurrent time periods comprise a semi-transparent mirror disposed obliquely across the paths of said measurement and reference beams, and two filters disposed respectively across the path of partial radiation reflected by said mirror, between it and one of said detector elements and across the path of partial radiation having passed through said mirror, between it and the other of said detector elements, said filters being capable of permitting the passage through them of said partial radiations respectively.

3. An apparatus according to claim 2 in which said detector elements are photo-electric cells.

4. An apparatus according to claim 1 wherein said detector elements are two gas filled chambers having walls transparent to the rays of said beams, the first of said chambers containing a gas capable of absorbing preferentially the first partial radiation and the second one containing a gas capable of absorbing the second partial radiation, and said means for applying the first and second partial radiations of said measurement beam, respectively, for said first recurrent time periods to said first and second detector elements and said means for applying the first and second partial radiations of said reference beam to said first and second detector elements, respectively, for said second recurrent time periods comprise the first of said chambers itself, disposed across the paths of said beams and having its transparent walls also across said paths whereby the second partial radiation can pass through said first chamber, said second chamber being disposed across said paths, behind said first chamber.

References Cited in the file of this patent

UNITED STATES PATENTS

| | | |
|---|---|---|
| 2,679,185 | Atwood | May 25, 1954 |
| 2,680,989 | Savitzky et al. | June 15, 1954 |
| 2,844,066 | Friel | July 22, 1958 |
| 2,878,388 | Bergson | Mar. 17, 1959 |
| 2,924,713 | Liston | Feb. 9, 1960 |
| 2,951,939 | Luft | Sept. 6, 1960 |
| 2,974,227 | Fisher et al. | Mar. 7, 1961 |